United States Patent Office 3,215,602
Patented Nov. 2, 1965

3,215,602
PROLONGED-ACTING ANTISCORBUTIC
SUBSTANCES
Julius Diamond, Decatur, Ill., assignor to Lincoln Laboratories, Inc., Decatur, Ill., a corporation of Indiana
No Drawing. Filed May 4, 1962, Ser. No. 192,323
2 Claims. (Cl. 167—81)

This invention relates to improvements in prolonged-acting antiscorbutic substances. More particularly it relates to aqueous suspensions of finely divided particles of water insoluble ascorbyl monoesters wherein the hydrogen atoms in the OH groups at either the 5 or 6 carbon atoms in the ascorbic acid molecules have been replaced with certain organic radicals containing 6 or more carbon atoms.

An important object of the invention is the provision of improved prolonged-acting antiscorbutic formulations capable of establishing and maintaining high blood levels of vitamin C upon parenteral administration.

The clinical use of 1-ascorbic acid in the treatment of a number of pathological conditions resulting from deficiency of vitamin C is so well known and established as not to require documentation. Parenterally administered ascorbic acid is frequently employed to produce a more rapid therapeutic effect and to assure more complete utilization of the administered dose. For parenteral use, aqueous solutions of sodium ascorbate or other water-soluble ascorbate salts have customarily been employed. However, ascorbic acid is not stored to any appreciable extent by the body but is rapidly inactivated in the tissues and/or excreted in the urine. A single injection of sodium ascorbate can produce elevated blood levels of ascorbic acid for normally 4 to 8 hours duration. Therefore daily or even more frequent injections are required with sodium ascorbate solution to produce therapeutic blood levels. Even if frequent injections of sodium ascorbate are given, elevated blood levels of ascorbic acid cannot be sustained, but instead, a number of peaks and valleys in blood level values will be produced.

I have discovered that certain carboxylic acid esters of 1-ascorbic acid act as repository forms of vitamin C to provide with a single injection, sustained elevated blood levels of ascorbic acid for prolonged periods. Accordingly, patients receiving such injections would be assured a continuous and adequate vitamin C therapy, while being spared the unpleasantness and inconvenience of frequent injections.

The esters employed in this invention are the 5- or 6-ascorbyl esters of higher molecular weight (i.e. from $C_6$) carboxylic acids having the following formula:

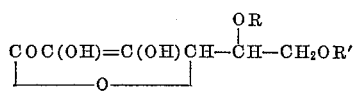

wherein one of the substituents R and R' represents a radical containing at least 6 carbon atoms and the other represents a hydrogen atom. These esters are characterized by their being water insoluble solids and by the presence of the 2,3-enediol function which also characterizes the vitamin C molecule. When injected, these esters provide a depot effect in the tissues since they depend on their low solubility in body fluids and the action of tissue esterases for the gradual release of the ascorbic acid component.

Ascorbyl monoesters of the four following groups are particularly suitable as repository forms of ascorbic acid in accordance with the present invention:

(1) Esters of higher molecular weight alphatic carboxylic acids such as ascorbyl laurate, ascorbyl myristate, ascorbyl palmitate, and ascorbyl stearate.

(2) Esters of higher molecular weight alicyclic carboxylic acids such as ascorbyl cyclohexylbutyrate, ascorbyl cyclopentylheptanoate, ascorbyl cyclohexyllaurate.

(3) Esters of higher molecular weight arylaliphatic carboxylic acids such as ascorbyl phenylacetate, ascorbyl phenylhexanoate, ascorbyl phenyllaurate.

(4) Esters of higher molecular weight aromatic carboxylic acids such as ascorbyl chlorobenzoate, ascorbyl benzoylbenzoate, ascorbyl dimethylbenzoate.

The ascorbyl monesters of the present invention may be prepared in known manner from equal molecular quantities of ascorbic acid and the carboxylic acid in the presence of an acid catalyst such as 95–100% sulfuric acid, 85–100% phosphoric acid, benzensulfonic acid, toluenesulfonic acid, or hydrogen chloride gas. For example, the reaction medium may be excess concentrated sulfuric acid, excess phosphoric acid, or an inert liquid medium in which the reactants may be suspended or dissolved. Patent 2,350,435, issued June 6, 1944, to Wells & Swern, discloses suitable procedures for preparing these higher ascorbyl monoesters using concentrated sulfuric acid.

The ascorbyl monoesters using in the present invention are solids at ordinary temperatures and may be milled and micronized to the desired particle size range. These micronized powders may be suspended in an aqueous vehicle which preferably contains one or more wetting agents selected from the group comprising propylene glycol, glycerol, polysorbate 20 (polyoxyethylene sorbitan monolaurate), polysorbate 80 (polyoxyethylene sorbitan mono-oleate) and polyethylene glycol 400. For parenteral use, the suspensions are sterilized by known techniques and preservatives may be added if desired. Those suspensions with a relatively high solids/liquids ratio and a thick consistency are best dispensed in a single dose, preloaded syringe of the cartridge-syringe type unit described, for example, in Patent 2,671,449, granted March 9, 1954, to Dann.

EXAMPLE I

This example illustrates a typical repository ascorbic acid composition containing ascorbyl monoester and formulated in accordance with the present invention. Each 1000 cc. of aqueous suspension will have the following composition containing the equivalent of 100 mg. of ascorbic acid per cc.:

6-ascorbyl palmitate _____ 235 gm.
Polyethylene glycol 400,
  49% by volume; polysorbate, 1% by volume; water, 50% by volume _____ Q.s. 1000 cc.

The ascorbyl palmitate which may be prepared in accordance with Example 3 of Patent 2,350,435 is milled and micronized to the desired particle size range and then sterilized. The sterilized micronized powder is then thoroughly mixed into the sterile aqueous vehicle and levigated. The resulting sterile aqueous suspension is then aseptically filled in known manner into 2 cc. sterile hypodermic syringes of the disposable or "one shot" type.

The foregoing composition after dilution with the vehicle to 40 mg. ascorbic acid per cc., was tested in rats and dogs at a dosage level of 9 mg. ascorbic acid per kg. body weight, and found to provide 72 to 96 hours of sustained elevated blood plasma levels of ascorbic acid. The following table compares the results to those obtained with sodium ascorbate solution under identical conditions:

*Table 1*

| Hours after Injection | Blood Plasma Level of vitamin C in Rat | | Blood Plasma Level of vitamin C in Dog | |
|---|---|---|---|---|
| | Sodium Ascorbate Soln., mg. (percent) | 6-Ascorbyl Palmitate Suspension, mg. (percent) | Sodium Ascorbate Soln., mg. (percent) | 6-Ascorbyl Palmitate Suspension, mg. (percent) |
| 0 (control) | 0.50 | 0.50 | 0.75 | 0.75 |
| 3 | 1.30 | 1.55 | 2.05 | |
| 6 | 0.90 | 1.55 | 2.30 | |
| 24 | 0.50 | 1.55 | 1.05 | |
| 36 | 0.50 | 1.55 | 0.75 | 1.80 |
| 48 | 0.50 | 1.55 | | |
| 56 | | 1.30 | | |
| 72 | | 1.05 | | 1.80 |
| 84 | | 0.50 | | 1.80 |
| 96 | | 0.50 | | 1.80 |
| 108 | | | | 0.75 |
| 120 | | | | 0.75 |

It is significant that in the dog the blood plasma level of ascorbic acid attained with injections of 6-ascorbyl palmitate suspension is 78% of the peak value observed with injections of sodium ascorbate solution.

Having fully disclosed the invention and set forth a preferred illustrative example thereof, those skilled in the art will be able to readily practice the same either according to the embodiments disclosed or obvious variations thereof.

What is claimed as new is:

1. The method of establishing and maintaining for prolonged periods therapeutic blood levels of ascorbic acid in warm-blooded animals which comprises parenterally administering thereto an aqueous suspension of finely divided particles of water insoluble ascorbyl monester of the formula:

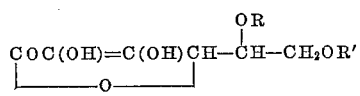

wherein one of the substituents R and R' represents a hydrogen atom and the other represents a radical selected from the group consisting of laurate, myristate, palmitate, stearate cyclohexybutyrate, cyclopentylheptanoate, cyclohexyllaurate, phenylacetate, phenylhexanoate, phenyllaurate, chlorobenzoate, benzoylbenzoate and dimethylbenzoate.

2. The method of establishing and maintaining for prolonged periods therapeutic blood levels of ascorbic acid in warm-blooded animals which comprises parenterally administering thereto an aqueous suspension of finely divided particles of 6-ascorbyl palmitate.

References Cited by the Examiner

UNITED STATES PATENTS

| 2,350,435 | 6/44 | Wells et al. | |
| 2,454,747 | 11/48 | Weisblat et al. | 167—81 |
| 2,454,749 | 11/48 | Wise | 167—81 |
| 2,721,161 | 10/55 | Maiese | 167—81 |
| 2,902,408 | 9/59 | Bouman et al. | 167—82 |
| 2,951,015 | 8/60 | Berger | 167—82 |
| 3,036,957 | 5/62 | Lehman | 167—81 |
| 3,070,499 | 12/62 | Mullins et al. | 167—58 |
| 3,089,822 | 5/63 | Schenk | 167—81 |

OTHER REFERENCES

Ambrose et al.: Archives of Biochemistry, vol. 12, March 1947, pp. 375–379.

De Ritter et al.: Science, vol. 113, No. 2944, pp. 628–630, June 1951.

JULIAN S. LEVITT, *Primary Examiner.*

FRANK CACCIAPAGLIA Jr., LEWIS GOTTS,
*Examiners.*